United States Patent
Tung et al.

(10) Patent No.: US 9,262,774 B2
(45) Date of Patent: *Feb. 16, 2016

(54) METHOD AND SYSTEMS FOR PROVIDING A DIGITAL DISPLAY OF COMPANY LOGOS AND BRANDS

(71) Applicant: Want Media Group Inc., Los Angeles, CA (US)

(72) Inventors: Mark Tung, Los Angeles, CA (US); Isaac Cheah, Los Angeles, CA (US); Brandon Foster, Los Angeles, CA (US)

(*) Notice: Subject to any disclaimer, the term of this patent is extended or adjusted under 35 U.S.C. 154(b) by 220 days.

This patent is subject to a terminal disclaimer.

(21) Appl. No.: 14/077,687

(22) Filed: Nov. 12, 2013

(65) Prior Publication Data
US 2015/0134448 A1    May 14, 2015

(51) Int. Cl.
*G06Q 30/02* (2012.01)
*H04M 1/72* (2006.01)
*H04W 4/18* (2009.01)
*H04M 1/725* (2006.01)

(52) U.S. Cl.
CPC ........ *G06Q 30/0267* (2013.01); *G06Q 30/0255* (2013.01); *G06Q 30/0257* (2013.01); *H04M 1/72525* (2013.01); *H04M 1/72552* (2013.01); *H04W 4/18* (2013.01); *H04M 1/72555* (2013.01)

(58) Field of Classification Search
CPC ......... G06Q 30/0255; H04M 1/72525; H04M 1/72552; H04M 1/72555; H04W 4/18; G06F 17/30253; G06F 2216/03
See application file for complete search history.

(56) References Cited

U.S. PATENT DOCUMENTS

| | | | |
|---|---|---|---|
| 5,761,689 A * | 6/1998 | Rayson et al. | 715/210 |
| 5,802,534 A * | 9/1998 | Hatayama et al. | 715/205 |
| 8,701,032 B1 * | 4/2014 | Zhai et al. | 715/773 |
| 2003/0023451 A1 * | 1/2003 | Willner et al. | 705/1 |
| 2008/0071612 A1 * | 3/2008 | Mah et al. | 705/14 |
| 2012/0089669 A1 * | 4/2012 | Berg et al. | 709/203 |
| 2013/0159431 A1 * | 6/2013 | Berry et al. | 709/206 |

OTHER PUBLICATIONS

Rawlinson, Android: Change Keyboard Based on App Using Tasker, Oct. 2, 2012, accessed Aug. 14, 2015 at http://code.rawlinson.us/2012/10/android-change-keyboard-based-on-app.html.*

Henr, The Best Text Expansion App for Android, Sep. 29, 2011, accessed Aug. 14, 2015 at http://lifehacker.com/5844895/the-best-text-expansion-app-for-android.*

* cited by examiner

*Primary Examiner* — William Spieler

(57) ABSTRACT

Described herein are methods and systems allowing a company to market and advertise its brands, products and/or services in a mobile platform by use of an application converting words and texts into logos and displaying the same. Particularly, this application allows company logos to be inserted and displayed in any mobile texts and messages whenever corresponding keywords are entered or selected by end users in a mobile communication application, such as SMS/text, IM, iMessage, and any social networking application, for example, Facebook and Twitter.

18 Claims, 18 Drawing Sheets

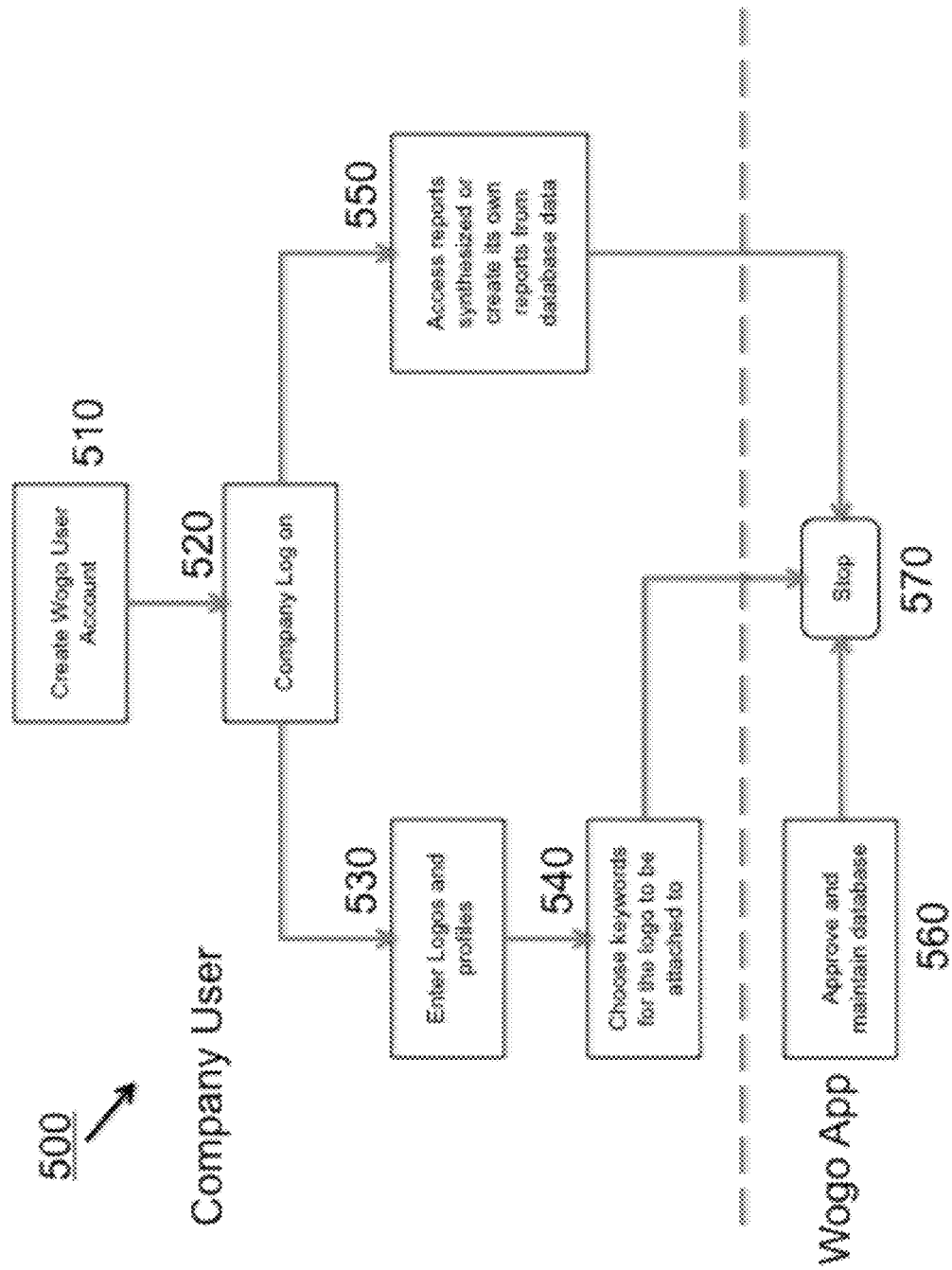

METHOD AND SYSTEMS FOR PROVIDING A DIGITAL DISPLAY OF COMPANY LOGOS AND BRANDS

FIELD OF THE INVENTION

The present invention relates generally to enhancing digital marketing in mobile devices, and more particularly, to methods and systems allowing companies to promote, market and advertise their brands, products and/or services by automatically converting one or more words and texts into logos in mobile communication applications.

BACKGROUND

With the popular use of mobile devices (e.g., smart phones, cell phones, tablets, etc.), today's digital environment has profoundly changed: more and more people use mobile devices rather than web-based computers to quickly search, retrieve, view and share information with their friends and contacts in a global scale. Particularly, the proliferation of various mobile communication applications, such as SMS/Text, MMS, Instant Messaging (IM), iMessage, Blackberry Message, Samsung ChatOn, Facebook Message, Twitter, Whatsup, Skype, WeChat, and so forth, allows people to contact and communicate with their friends and contacts at any time and from anywhere. When people text each other using any of these applications, it is customary practice to shorten certain words and/or use emotional icons in their messages. In fact, most of these applications provide built-in "emoticons" for users to choose and insert in their text messages, although the available "emoticons" might be limited depending on specific configurations of these applications.

In view of the ever-changing digital environment, many companies have increasingly adopted mobile devices and applications installed therein as another marketing and advertising platform, in addition to conventional media such as newspaper, billboards, TV, radio, online search engine (e.g., Google) and websites accessible through computers linked to the Internet. For example, companies may specially create a mobile version of their advertisements (e.g., commercial banners) to be displayed at the edge or in the corner of a smart phone screen when certain applications are activated in mobile devices. However, unlike conventional media such as newspaper, billboards, TV and web pages, most mobile devices, such as iPhone and Android phones, have very limited display space for displaying advertisements. As a result, oftentimes people find those advertisements distractive and even offensive for blocking their viewing of digital contents in mobile devices.

Therefore, a need exists for advertising and marketing companies' brands, products and services in the mobile plateform in an easy, effective and non-intrusive manner. On the other hand, there is conceivable benefit for mobile device users if company logos can be used, displayed or otherwise incorporated seaminglessly in mobile communication applications, similar to "emoticons," for immediate visual attention.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a method for converting a text entry into a logo in a mobile communication application, which comprises: receiving a text entry in a mobile communication application; determining whether said text entry is associated with a first logo; and upon the determination that said text entry is associated with a first logo, automatically replacing said text entry with said first logo and displaying said first logo in said mobile communication application. The method further comprises: determining whether said text entry is associated with first and second logos; upon the determination that said text entry is associated with first and second logos, displaying said first and second logos in said mobile application; receiving a user selection of at least one of said displayed first and second logos; and in response to said user selection, replacing said text entry with said at least one of said displayed first and second logos. In one embodiment, the step of determining whether said text entry is associated with a first logo further comprises determining whether said text entry is a brand word corresponding to a company brand, wherein said company brand is associated with one or more logos including at least said first logo. In another embodiment, the step of determining whether said text entry is associated with a first logo further comprises determining whether said text entry is a search word correlated to one or more company brands, each company brand associated with one or more logos.

Another embodiment is directed to a non-transitory computer readable medium comprising executable instructions, the executable instructions, while executed, causing a processor to perform: receiving a text entry in a mobile communication application; determining whether said text entry is associated with a first logo; and upon the determination that said text entry is associated with a first logo, automatically replacing said text entry with said first logo and displaying said first logo in said mobile communication application.

Yet another embodiment provides a device comprising: a screen display; a memory comprising executable instructions; and a processor configured to execute the executable instructions in the memory, the processor further configured to: receiving a text entry in a mobile communication application; determining whether said text entry is associated with a first logo; and upon the determination that said text entry is associated with a first logo, automatically replacing said text entry with said first logo and displaying said first logo in said mobile communication application.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 5 is a flow diagram of an exemplary process in which embodiments of the invention can be implemented;

DETAILED DESCRIPTION OF EXEMPLARY EMBODIMENTS

Figure 1:
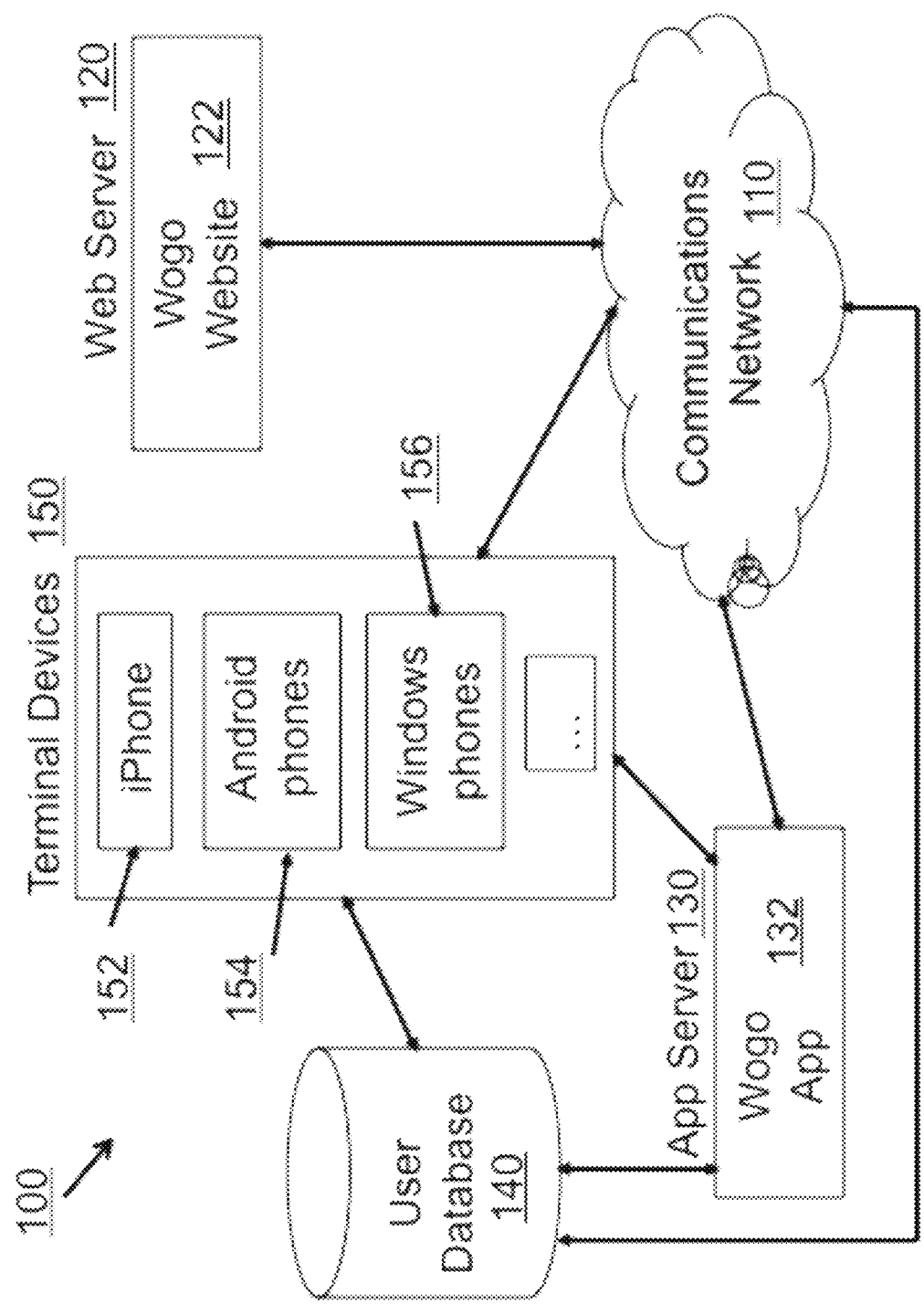
FIG. 1 is a high-level overview of an exemplary system in which embodiments of the invention can be implemented.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs. The word "logo" is used herein to encompass any logo, design, image, or combination of textual and graphic content associated with a brand.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Embodiments disclosed herein are directed to methods and systems allowing a company to market and advertise its brands, products and/or services in a mobile platform by use of an application converting words and texts into logos and displaying the same. Particularly, this application allows company logos to be inserted and displayed in any mobile texts and messages whenever corresponding keywords are entered or selected by end users in a mobile communication application, such as SMS/text, IM, iMessage, and any social networking application, for example, Facebook and Twitter. In one embodiment, the application receives a text entry in a mobile communication application and determines whether the text entry is associated with a logo, and if so, automatically replaces said text entry with the logo and displays the logo in said mobile communication application.

As partial implementation of the methods and systems, a mobile device is provided according to another embodiment. In particular, the processor in the device is configured to receive a text entry in a mobile communication application, determine whether said text entry is associated with a first logo, and upon the determination that said text entry is associated with a first logo, automatically replace said text entry with said first logo and display said first logo in said mobile communication application.

It should be appreciated that the embodiments described herein are illustrated by referring to currently-prevalent text and messaging applications such as SMS, MMS, IM, iMessage, Samsung ChatOn, Facebook, Twitter, Whatsup, Skype, WeChat, etc., the application of these embodiments are not so limited, but can include any type of existing or future social network platforms that people may adopt in view of the continuous evolvement of technologies.

Referring to FIG. 1, illustrated therein is a high-level overview of an exemplary system 100 in which embodiments of the invention can be implemented. As shown in FIG. 1, the system 100 comprises a communications network 110 and a few entities connected to the network, including one or more web servers 120, one or more application servers 130, a user database 140 and one or more terminal devices 150.

The communication network 110 can be one or a combination of the following networks: the Internet, Ethernet, a mobile carrier's core network (e.g., AT&T or Verizon networks), a Public Switched Telephone Network (PSTN), a Radio Access Network (RAN), and other wired or wireless networks.

The web server 120 is configured to host a website or web-based application 122 ("Wogo" Web) for company users to register and enter their logo information, as will be described herein below. Preferably, the application 122 is a website form accessible over the Internet, but it can also be downloaded and installed in a mobile device. All the company information, such as the company address, account, contact and payment, and all related logo data can be stored in the user database 140, as with end user data, or in separate databases accessible to the web server 120.

The application server 130 is configured with computer software, executable programs, algorithms, functional modules and processes, such as the application 132 (e.g., "Wogo" App) for converting words and texts into company logos. The application 132 is also configured to not only display the converted logos, but also allow users to select and search for logo-related information, as will be described in detail below. The application 132 can be downloaded and installed in any mobile device from a website, an App Store typical of iPhones, or any application utility provided by Android phones, Windows phones or any other mobile devices. In practice, various versions and updates of the application 132 can be provided in order to be compatible with different mobile operating systems such as Apple iOS, Android or Windows.

Upon authorization of registered users of the application 132, the application server 130 is also capable of storing user information in the user database 140 and accessing the same, whenever needed, to compile user reports for company users. For example, the user information in the user database 140 can include the user's current location, search history, name, age, gender, date of birth, home address, occupation, ethnicity, phone number, email, etc.

As illustrated in FIG. 1, terminal devices or mobile devices 150 comprise various smart phones such as iPhone 152, Android phones 154, Windows phones 156. However, the devices 150 are not so limited, but may include many other network devices, including a fixed or mobile subscriber unit, a pager, a cellular telephone, a personal digital assistant (PDA), a smart phone, a laptop, a netbook, a tablet computer, a personal computer, a wireless sensor, consumer electronic devices, and the like.

It should be appreciated that the system 100 in FIG. 1 is for illustration only and can be implemented with many variations without departing from the spirit of the invention. For instance, the web server 120 and application server 130 each can include multiple computers and stations distributed in different locations.

Figure 2:
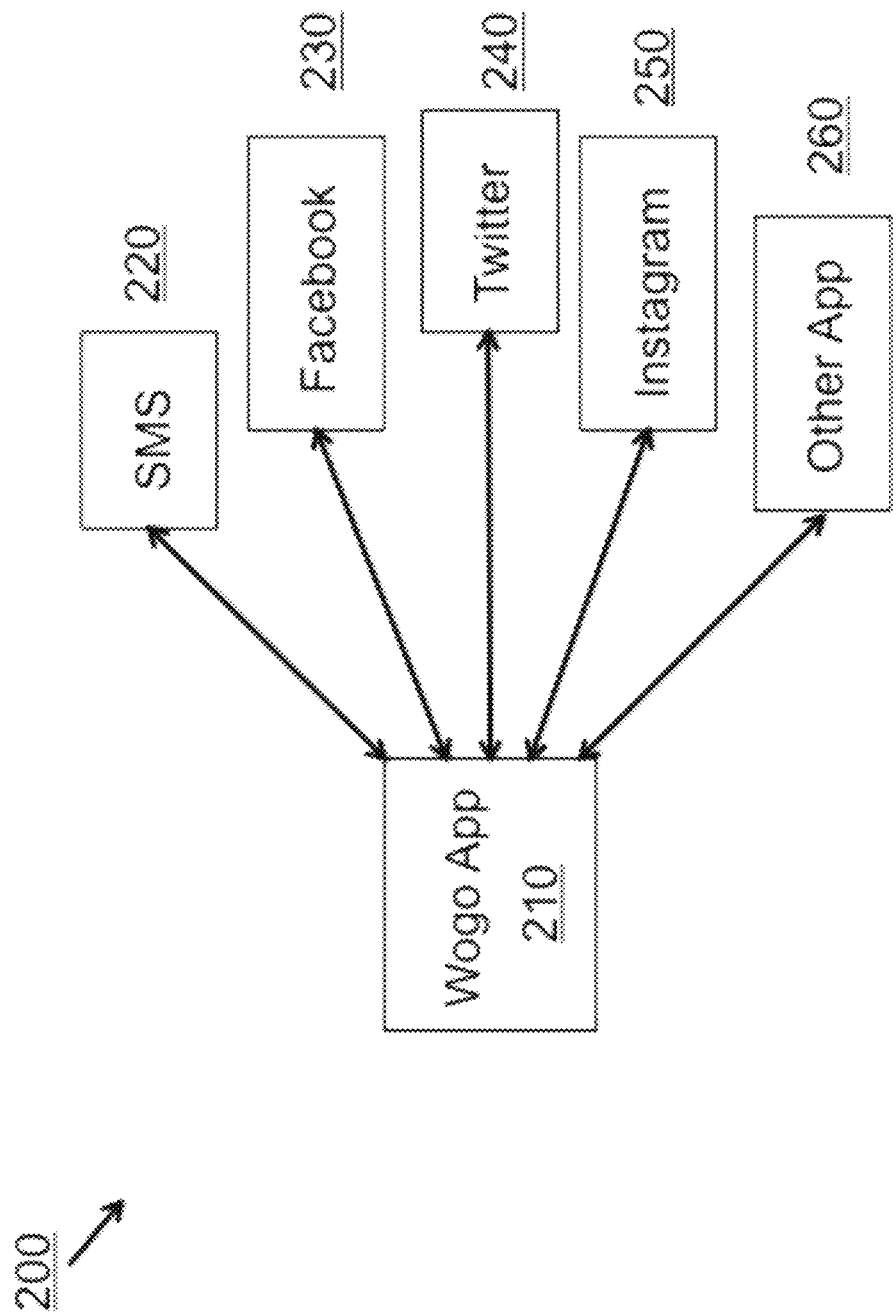
FIG. 2 illustrates exemplary applications interacting with embodiments of the invention.

FIG. 2 shows exemplary applications interacting with embodiments of the invention. For example, when the application 210 ("Wogo" App) is enabled in the user's mobile device, it allows users to convert words and texts into logos in mobile communication applications including various texting/messaging applications such as SMS 220, and social networking applications such as Facebook 230, Twitter 240 and Instagram 250 and many other applications 260 capable of sending and receiving communications. It should be understood that the applications in FIG. 2 are for illustration only, and the applicability of the Wogo Application is not limited, but can include any application installed and ready to use in the user's mobile device.

Figure 3:
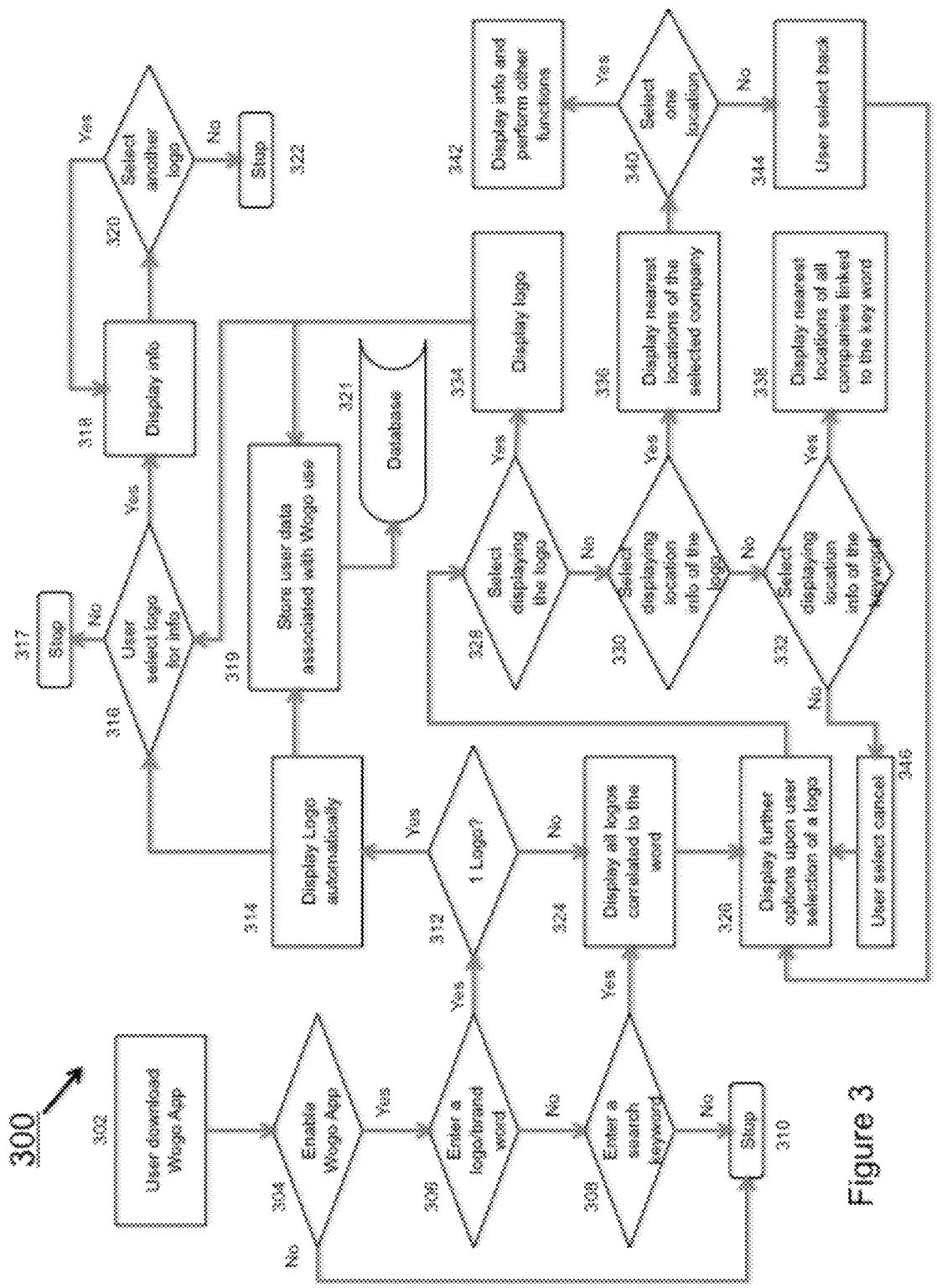
FIG. 3 is a flow diagram of an exemplary algorithm underlying a mobile application in which embodiments of the invention can be implemented.

FIG. 3 is a flow diagram of an exemplary algorithm underlying a mobile application (e.g., Wogo App 122 in FIG. 1 and Wogo App 210 in FIG. 2) in which embodiments of the invention can be implemented. In operation, any user can download the mobile application into their mobile terminal, an iPhone, Android phone or Windows phone, just to name a few. The algorithm in FIG. 3 will be described in detail below with references to FIGS. 4a-g, in which exemplary screen shots of the mobile application are illustrated.

Figure 4A:
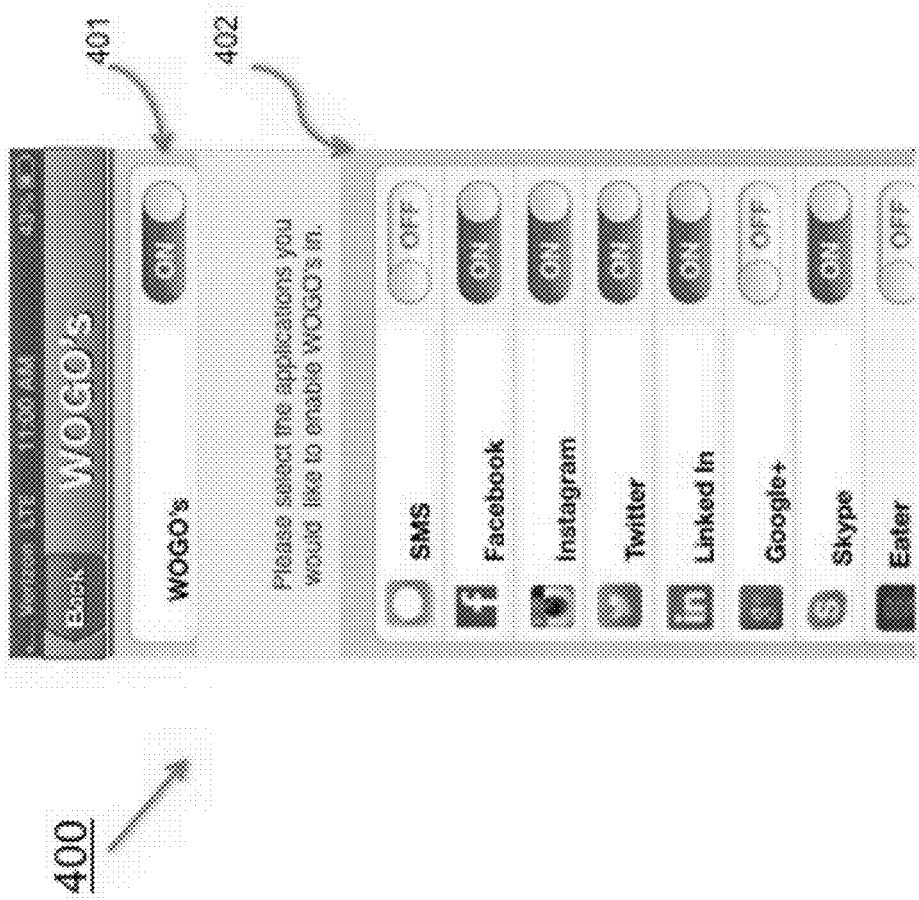
FIGS. 4a-g illustrate exemplary screen shots of the mobile application of FIG. 3 in which embodiments of the invention can be implemented.

As shown in FIG. 3, the algorithm 300 starts at step 302, where a user downloads the mobile application (hereinafter referred as "Wogo App") into his/her mobile terminal device. As aforementioned, the Wogo App can be downloaded from a website over the Internet or directly from the application store available in any smart phone or mobile device. Once the Wogo App is downloaded and installed in the user's mobile device, at step 304, the user can determine whether to enable the application, as shown in FIG. 4a. The screen shot 400 in FIG. 4a shows that the user can switch on or off the Wogo App by changing settings in his/her mobile device. The On/Off button 401 allows the user to enable or disable the use of Wogo App in his/her device. Further, the remaining settings 402 allow the user to choose specific applications in which the Wogo App is enabled. For example, as shown in FIG. 4a, the use of Wogo App is blocked in SMS, but enabled in Facebook, Instagram, Twitter, etc. This means, when the user types a keyword in an SMS message, the keyword will not be converted into a company logo, but in Facebook, the keyword will be displayed as the corresponding company logo.

Figure 4B:
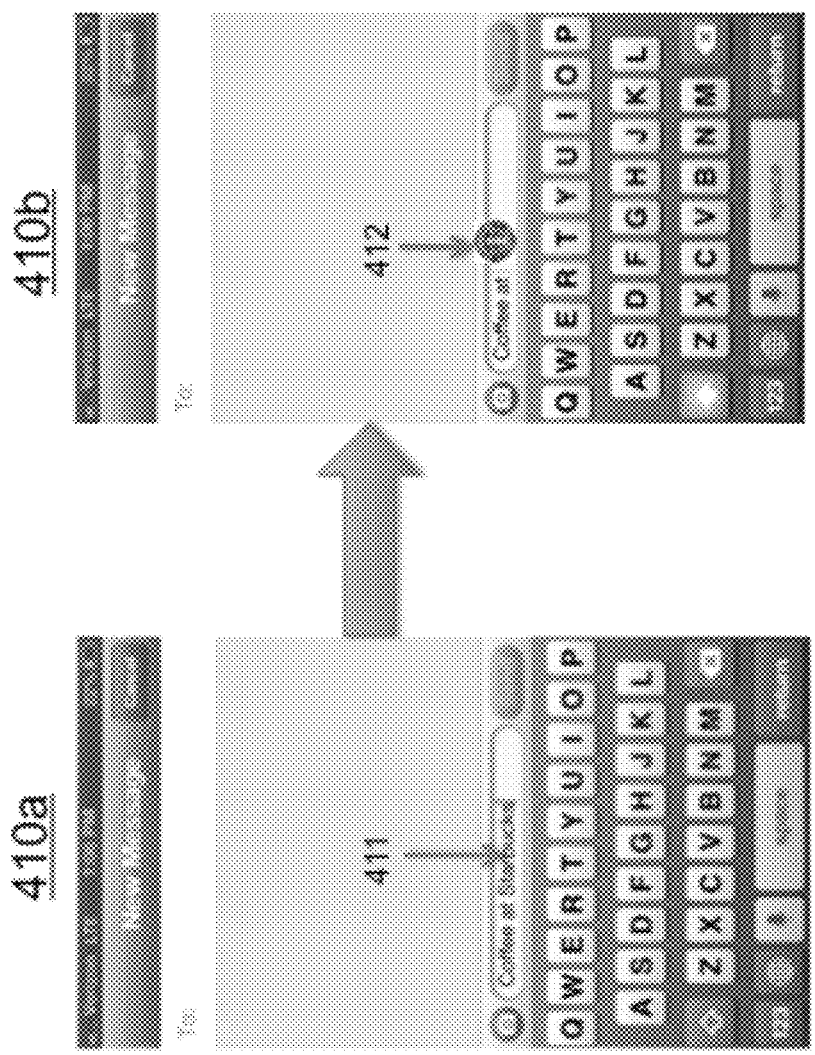

Back to FIG. 3, if the Wogo App is disabled at step 304, the algorithm 300 will end at step 310, but if the Wogo App is enabled to use in given applications, the algorithm 300 will proceed to step 306 determining whether a user has entered a keyword corresponding to a company logo or brand mark. If so, the process continues to decide whether the word corresponds to only one logo at step 312, and if so, the Wogo application will enable an automatic display of the logo. For example, as illustrated in FIG. 4b, if a user enters the word "Starbucks" 411 in his/her text message in the screen shot 410a, the corresponding logo 412 will be displayed automatically in the screen shot 410b. If the entered keyword corresponds to multiple logos, the process will proceed to step 324, as will be described in detail below.

Figure 4C:
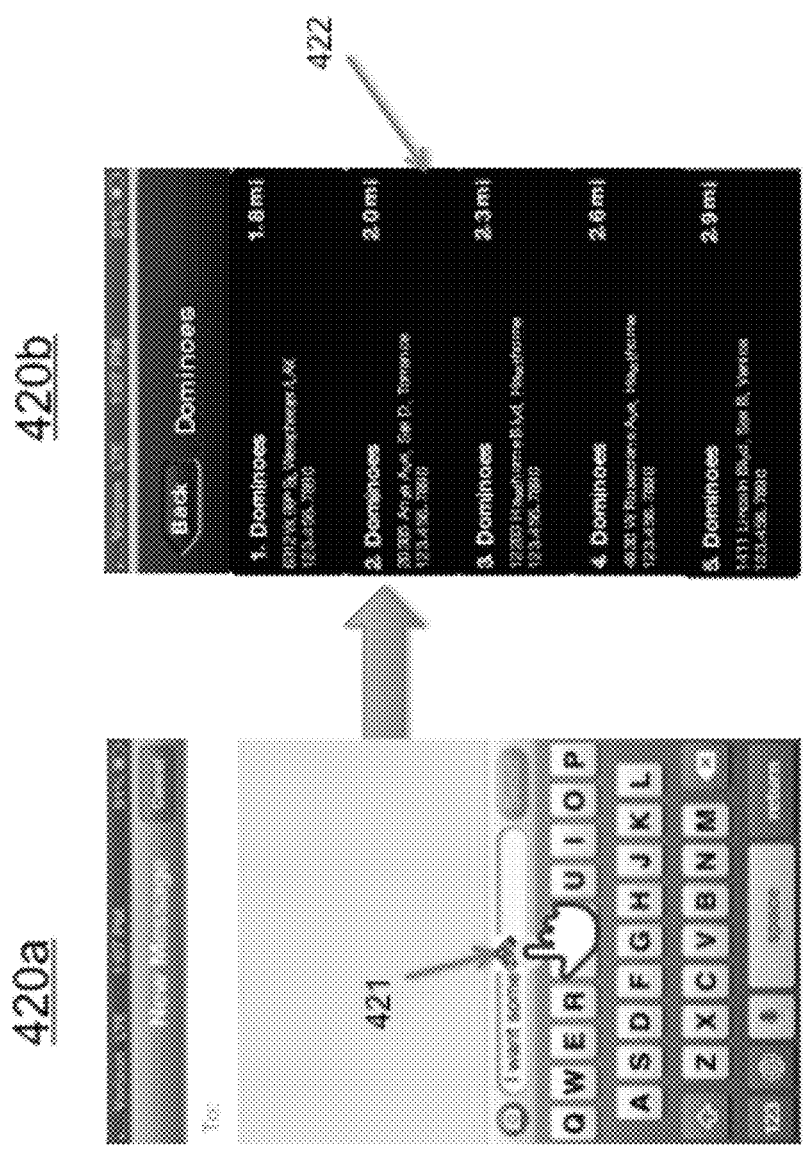

In one embodiment, after the logo is displayed at step 314, the Wogo App is further configured to allow the user to select the displayed logo for related information. At step 316, if the user does not select the displayed logo for information, the process ends at step 317, otherwise the process proceeds to step 318, where certain logo-related information is displayed. As illustrated in FIG. 4c, the screen short 420a shows that the user selects the "Domino's" logo 421, and as a result, store location information 422 is displayed accordingly in the screen shot 420b. The user can continue to select another logo for related information to be displayed, as shown at step 320 of FIG. 3.

In the above-described process, while the user enabled the Wogo App for logo conversion and display in his/her other applications in the mobile device, such as SMS, the Wogo App is capable of tracking and storing user data associated with such use in a user database 321, as shown in step 319. Also stored in the user database 321 is all related user information, including the user's current location, search history, name, age, gender, date of birth, home address, occupation, ethnicity, phone number, email, and all other types of data authorized by the user.

Figure 4D:
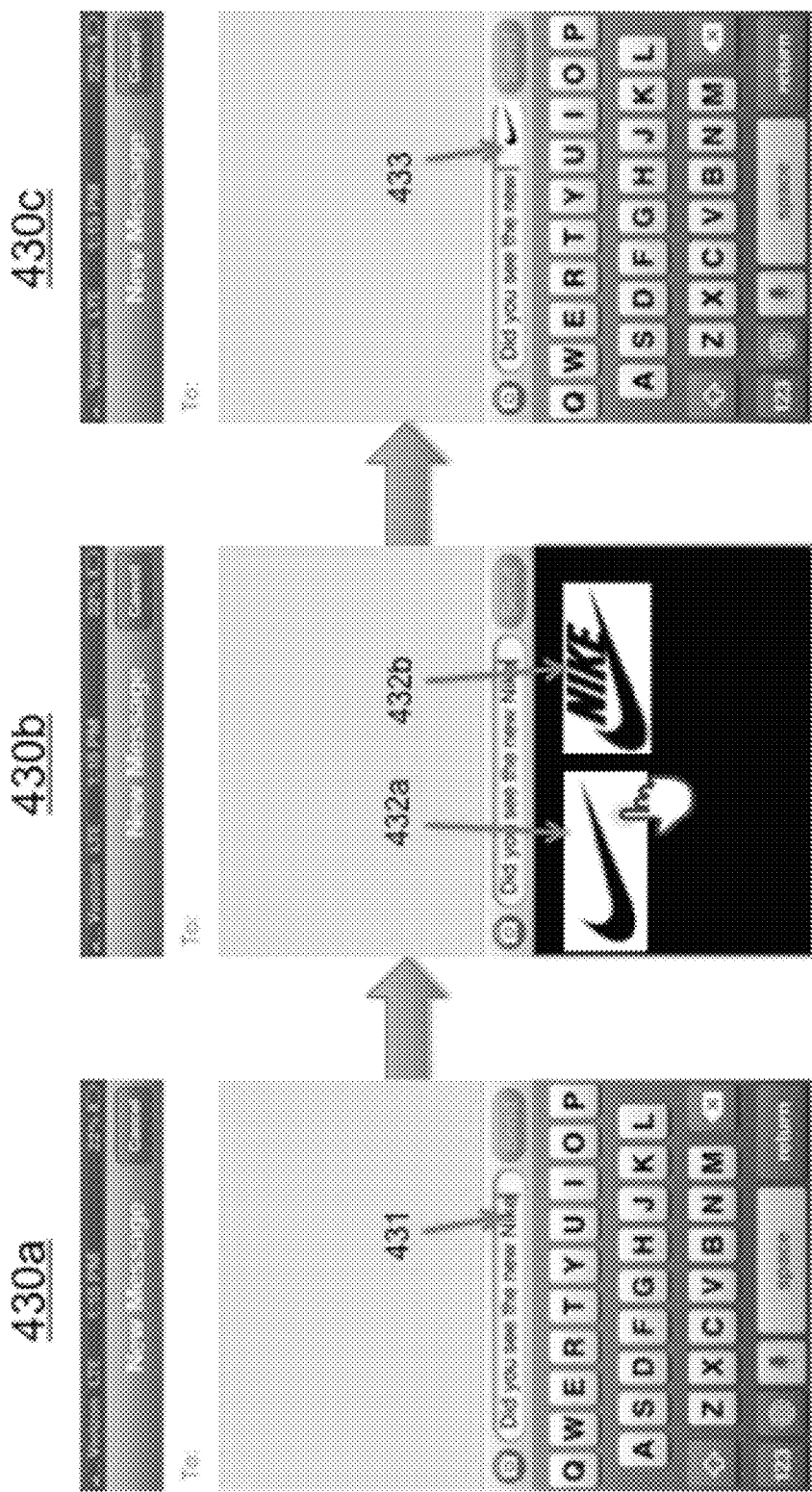

Back to step 312, if the user has entered a keyword corresponding to more than one company logo, the Wogo App will then display all the related logos at step 324. This step is illustrated in FIG. 4d. In the screen shot 430a, a user enters the word "Nike" 431. As shown in the screen shot 430b, two corresponding logos 432a and 432b are displayed for the user to select. For example, if the user selects the logo 432a (e.g., by tapping on or performing a "cut and paste" action to the logo 432a), the selected logo will be displayed in the text message (see the displayed logo 433 in the screen shot 430c), but if the user does not select any logo or cancels her logo selection, no logo will displayed in the text message.

Figure 4E:
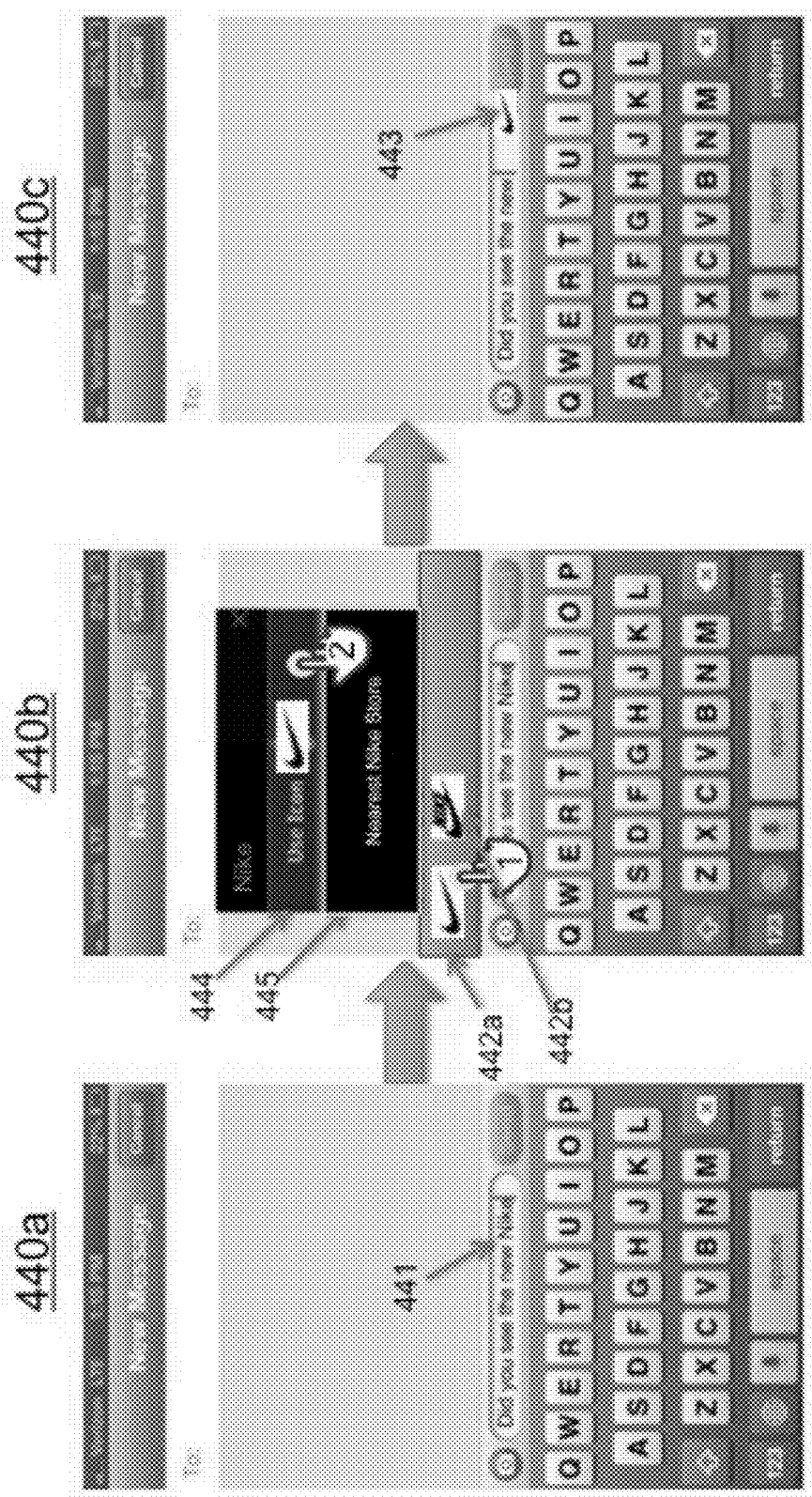

FIG. 4e illustrates an alternative embodiment when the user enters a keyword corresponding to more than one logo. Similar to FIG. 4d, the user may enter the keyword "Nike" 441 in the screen shot 440a. As a result, the screen shot 440b displays two corresponding logos 442a and 442b. When the user selects the logos, for example, logo 442a, the Wogo App shows further options such as the option 444 to "Use Icon" and the option 445 for showing "Nearest Nike Store." If the user further selects the option 444 for using the Nike icon, then the logo 443 will be displayed in the next screen shot 440c.

In the above-described process, the user enters a logo or brand word, meaning a word associated with specific company logos. In certain circumstances, however, the user may enter words or texts that are not necessarily associated with specific company logos, but may lead to a keyword search for related company brands, products and services. In the latter case, embodiments of inventions are also applicable, as will be described in detail below with references to other steps in the exemplary algorithm 300.

One particular embodiment of the invention allows the user to enter a search keyword rather than a keyword having an exact match of company logos. The search keyword can be generic word relating to products and services by multiple companies, and thus, providing multiple choices for the user to further select. Back to step 306, when the Wogo App determines that the user does not enter any keyword corresponding to exact company logos, the process continues to step 308 where the Wogo App further determines whether the user has entered a search keyword. If not, the process ends at step 310, otherwise, the Wogo App will display all logos correlated to the entered search keyword at step 324, similar to the above-described process.

Then the process will continue to step 326, where the Wogo App displays further options once the user selects a particular logo out of all the displayed logos. One option is, if the user selects displaying the logo at step 328, the selected logo will be displayed at step 334. Another option is, if the user selects displaying the location information of the selected logo at step 330, the Wogo App will display the nearest locations of the selected logo at step 336. In this instance, the Wogo App further allows the user to select one particular location for related information at step 340. Thereafter, the Wogo App can display related information or even perform other related functions, such as taking the user to a web browsing page, at step 342, or take the user back to step 326 if the user selects a back option at step 344. A third option is, if the user selects displaying location information of the entered keyword at step 332, the Wogo App will display the nearest locations of all companies linked to the entered keyword at step 338. If none of the options is selected or the user cancels all the options at step 346, the process returns to step 326. It should be understood that the optional steps 328, 330 and 332 are for illustration only, and in practice, the Wogo App may provide one or more of these options, different variations and combinations thereof.

Figure 4F:
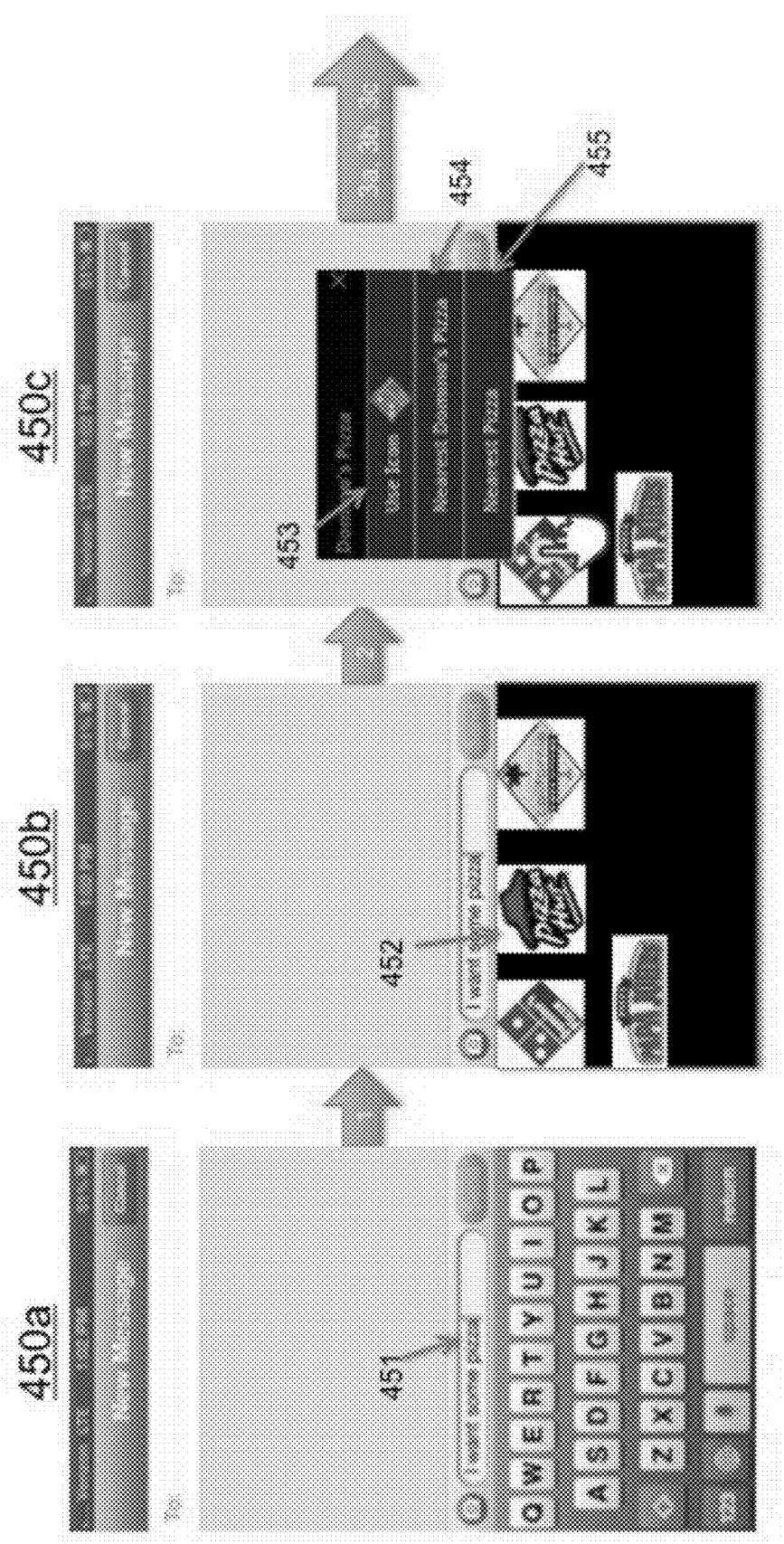
Figure 4G:
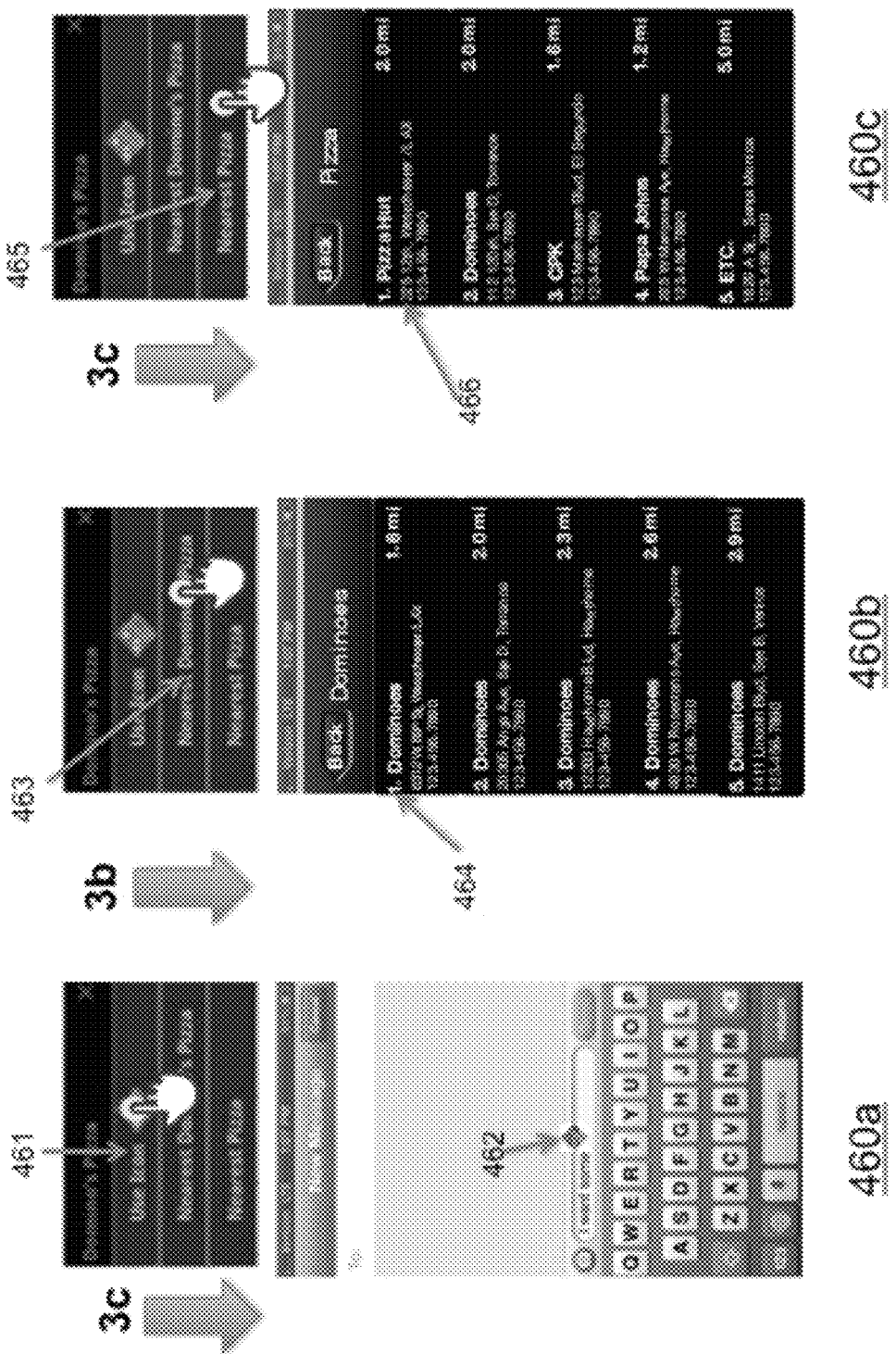

FIGS. 4f-g illustrate the above process for a keyword search and subsequent logo display. As seen in the screen shot 450a, the user enters a generic word "pizza" 451 in his/her text message. This word "pizza" 451 can be a search keyword causing a display of multiple logos of pizza companies. For example, the screen shot 450b presents multiple logos 452, such as Domino's, Pizza Hut, California Pizza Kitchen and Papa Johns After all these logos related to the word "pizza" are shown, the user may select a particular one, for example, Domino's, as shown in the screen shot 450c. Upon such a selection, the Wogo App provides further selections, such as an option 453 to "Use Icon," an option 454 for showing "Nearest Domino's Pizza," and an option 455 for showing "Nearest Pizza" in the screen shot 450c.

Turning to FIG. 4g, if the user selects the option 461 of "Use Icon," the Domino's logo 462 will be displayed in the screen shot 460a. If the user selects the option 463 for showing "Nearest Domino's Pizza," the location information 464 will be displayed in the screen shot 460b. If the user selects the option 465 for showing "Nearest Pizza," location information 466 for all pizza companies including Pizza Hut, Domino's, CPK and Papa Johns will be displayed in the screen shot 460c.

It should be appreciated that the algorithm 300 in FIG. 3 and all the screen shots in FIGS. 4a-g are for illustration only and can be implemented with many variations without departing from the spirit of the invention. For instance, the algorithm 300 may include fewer or more steps than what is illustrated in FIG. 3. Also, despite the step labels, there is no strict order of performing the illustrated steps, and some steps can be performed concurrently with others. Likewise, the screen shots in FIGS. 4a-g are for illustration only and by no means limit or otherwise define the inventive embodiments. As will be appreciated, many variations of these screen shots can be applied in terms of implementing various embodiments of the invention.

FIG. 5 is a flow diagram of an exemplary process 500 primarily from a company user's perspective how to use one embodiment of the inventive application for registering and associating its logos to the brand words as well as certain search keywords and texts. In operation, a company user can access and use the inventive application from a website using the Internet access or download the application into his or her mobile device, a smart phone, for example.

The process in FIG. 5 will be described in detail below with references to FIGS. 6a-e, in which exemplary screen shots of an online application are illustrated according to embodiments of the invention.

Figure 6A:
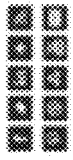
FIGS. 6a-e illustrate exemplary screen shots of certain steps of the process of FIG. 5 in which embodiments of the invention can be implemented.

As seen in FIG. 5, the process 500 starts at step 510, where a company user can create a Wogo user account with an online application. FIG. 6a demonstrates a account creation web page of such an online application. As aforementioned with reference to FIG. 1, this online application can be powered and hosted by one or more web servers. The web page 600 of FIG. 6a shows that a company user can create a user account by filling out all the blanks Thereafter, once the Wogo application and service provider approves the company user's account, the company user will be notified via emails, phone calls, etc.

Figure 6B:
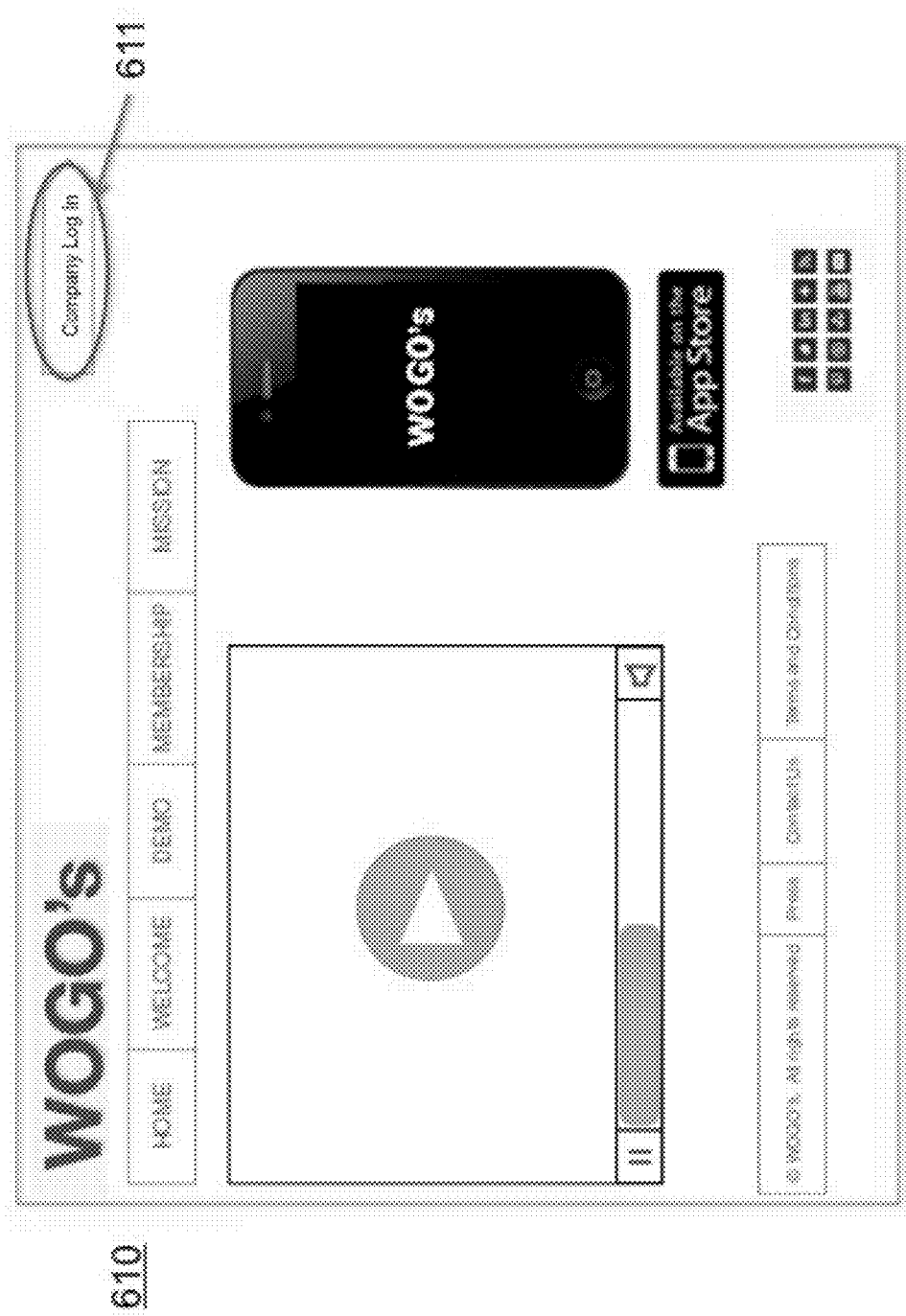
Figure 6C:

At step 520, the company user with an approved user account can go to the web page 610 as shown in FIG. 6b for log on by clicking the button 611 "Company Log in." Then in the following web page 620 in FIG. 6c will be shown, which requires the company user to enter a user ID 621 and a password 622. Once the company user enters correct information, it will pass the security check and log into the system. However, if the provided information is incorrect, the company user will be required to correct its entries or go back to the Wogo service provider for correct user ID and password.

Figure 6D:
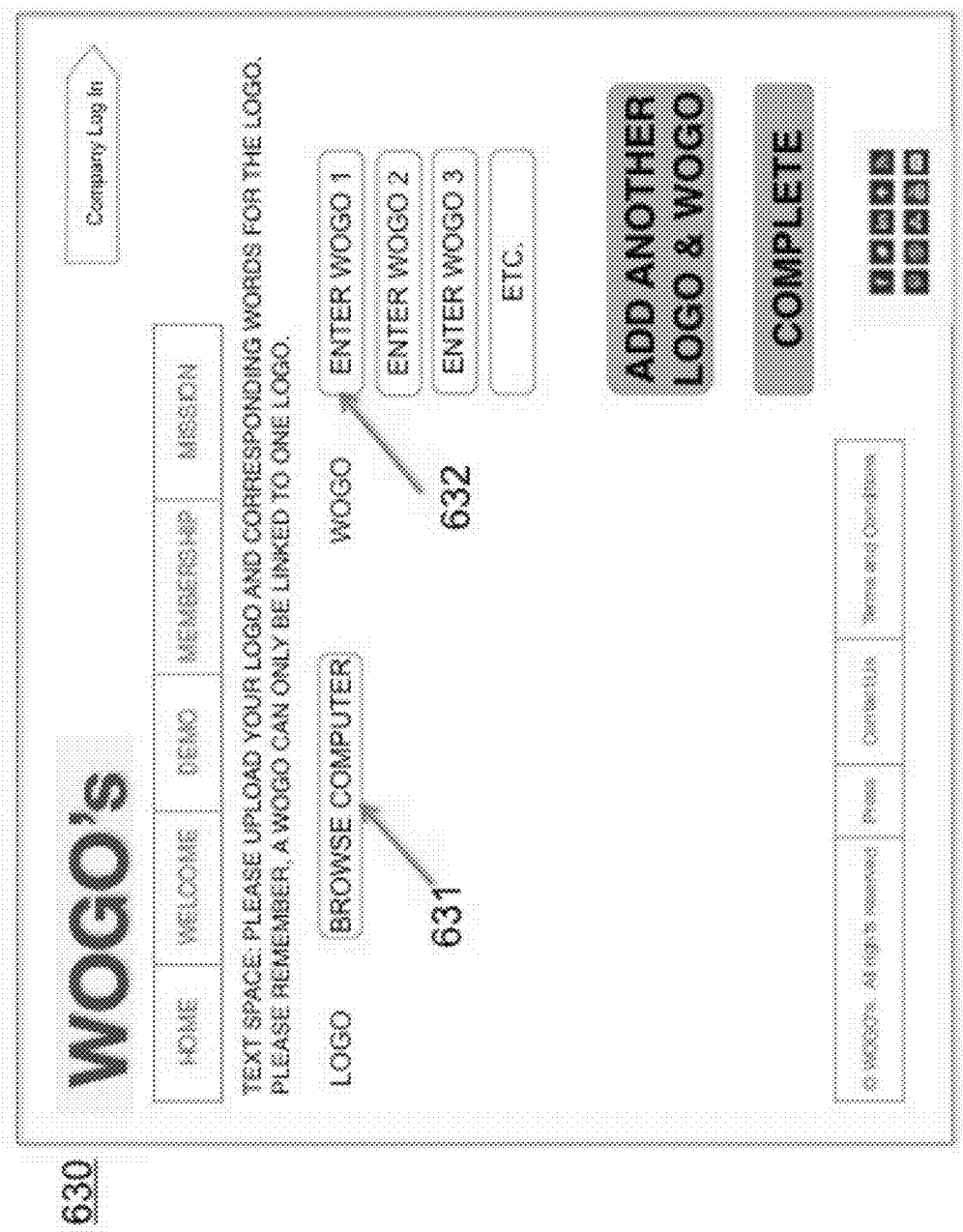
Figure 6E:
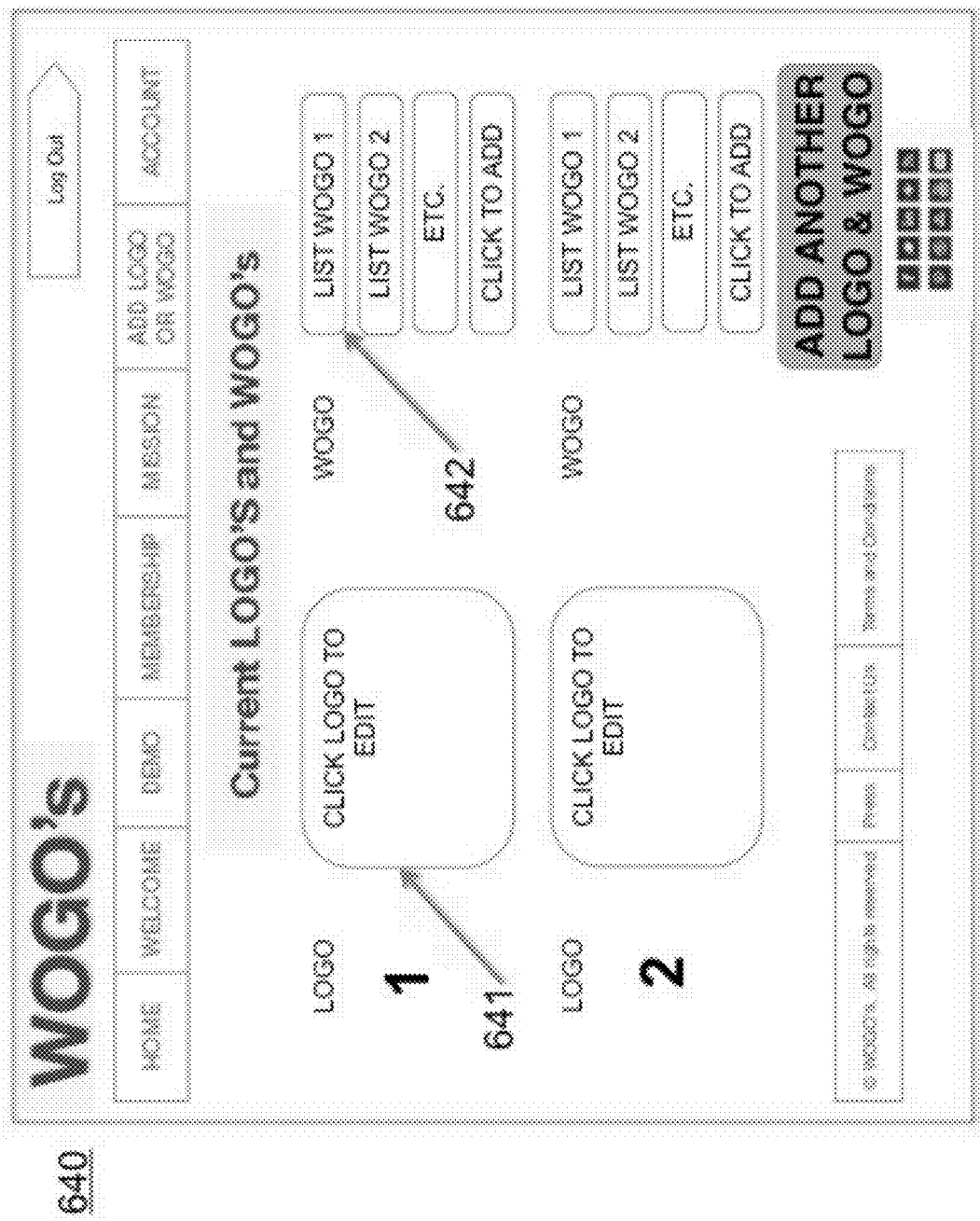

Steps 530 and 540 allow the company user to enter its logos and profiles and associate each logo to one or more brand words and texts, as well as one or more search keywords, as demonstrated in FIGS. 6d-f. The web page 630 of FIG. 6d shows that the company user can click the button 631 "Browse Computer" for uploading a logo image, such as a jpeg, gif, pdf, bmp, word, and text document. After the logo image is uploaded, the company user can associate the logo to one or more words and texts by entering texts and words in the text boxes 632. For example, the company user can upload the logo image of Domino's, and enter words such as "Domino's" and "Pizza" in the text boxes 632. Following this process, the company can upload multiple logo images, and associate each logo image to different descriptive words and texts, until it is complete. FIG. 6e provides a similar web page 640 that allows the company user to further edit its uploaded logo images and associated words and texts throughout its use of Wogo application and services.

As mentioned previously in FIG. 1, embodiments of the invention allow end user data to be stored in a user database accessible to both the Wogo application server and Wogo web server. Such user data can include, without limitation to, the user's current location, search history, name, age, gender, date of birth, home address, occupation, ethnicity, phone number, email, etc. The user data can be very beneficial to the company user in terms of analyzing consumer behaviors and promoting its brand power. Thus, once the company user is logged in the system, step 550 allows the company user to access various reports synthesized from the stored end user data. Alternatively, at step 550, the company user can also create its own reports based on the end user data collected by the Wogo App from all individual mobile or terminal devices.

The Wogo application and service provider, usually a third-party application developer and provider, maintains the end user database as well as the company user database as shown in step 560. Such data maintenance includes, without limitation to, approving and verifying the company user accounts, collecting and analyzing end user data, creating and compiling data analyses and reports, and performing data backup and copies and security check on a periodic basis.

It should be appreciated that the process 500 in FIG. 5 is for illustration only and can be implemented with many variations without departing from the spirit of the invention. For instance, the process 500 may include fewer or more steps than what is illustrated in FIG. 5. Also, despite the step labels, there is no strict order of performing the illustrated steps, and some steps can be performed concurrently with others. Likewise, it should be understood that the exemplary web page displays in FIGS. 4a-j are for illustration only and by no means limit or otherwise define the inventive embodiments. As will be appreciated, many variations of these screen shots can be applied in terms of implementing various embodiments of the invention.

Figure 7:
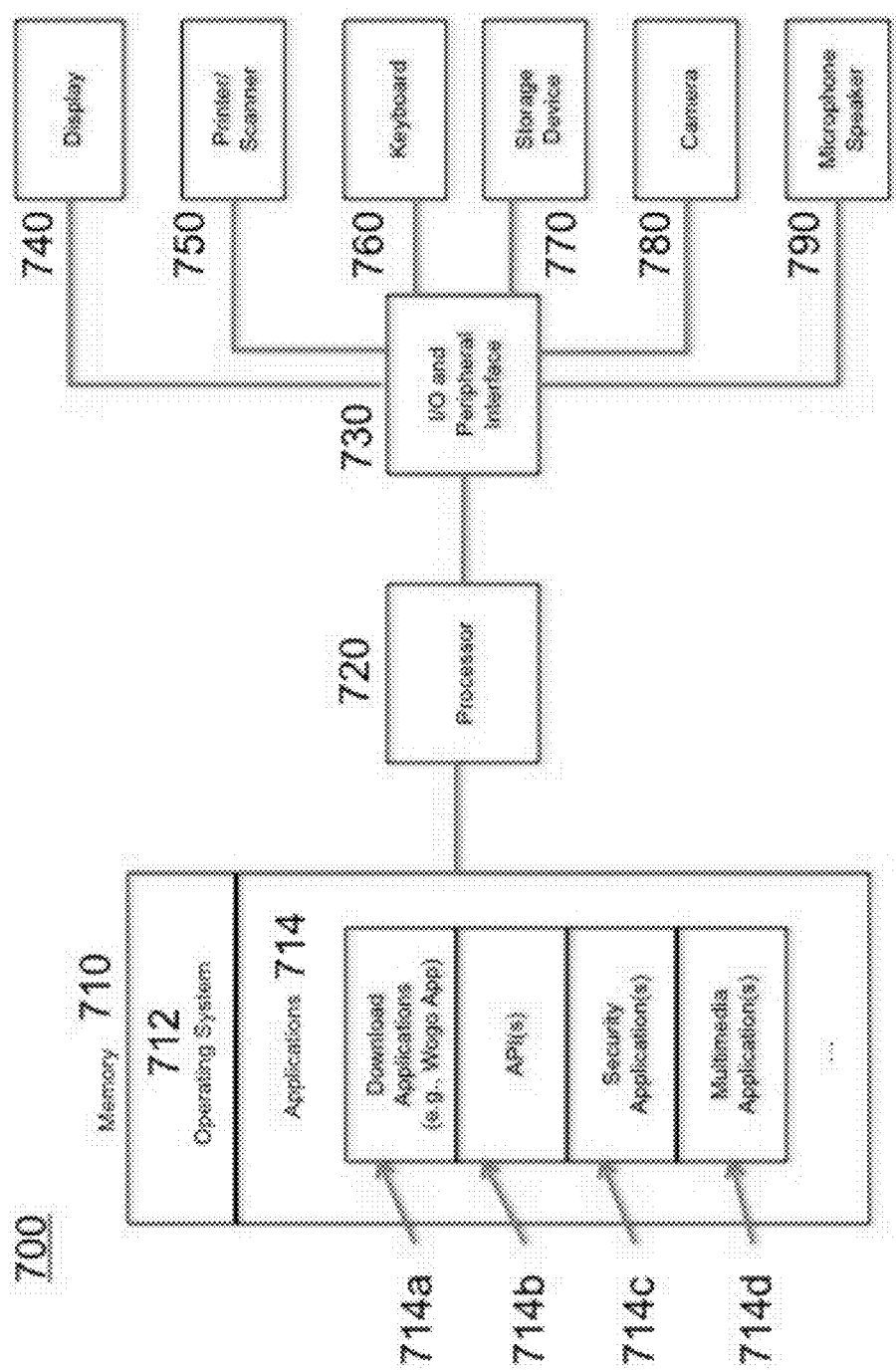
FIG. 7 is a simplified functional block diagram of an exemplary computer that can be implemented in the exemplary system of FIG. 1.

FIG. 7 is a simplified functional block diagram of an exemplary computer programmed or configured to execute a portion of the exemplary processes of FIGS. 3 and 5. This exemplary computer 700 can also be implemented as the web server 120 or the application server 130 in the exemplary system of FIG. 1. It should be noted that the computer 700 is for illustration only, and many computer components included therein may not be shown or described in the following paragraphs.

As shown in FIG. 7, the computer 700 comprises a memory 710, a processor 720 capable of accessing the memory 710, and one or more I/O interfaces or other peripheral interfaces 730 coupled to the processor 720. Exemplary external or peripheral devices include, without limitation, a display 740, a keyboard 760, a camera 780, a printer or scanner in a combined or separate form 750, a storage device 770 such as a USB or disk, and a microphone or speaker 790. The memory 710 includes software programs or drivers for activating and communicating with each peripheral device. In one configuration, these components are connected through one or more communication buses (not shown) in the computer, which may include circuitry that interconnects and controls communications between different components.

The memory 710 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 710, or alternately non-volatile memory device(s) within the memory 710, includes a non-transitory computer-readable storage medium. While the memory 710 is shown as being separate from the processor 720, all or a portion of the memory 710 may be embedded in the processor 520. In some embodiments, the memory 710 stores the following programs, modules and data structures, or a subset thereof: an operating system 712 that includes procedures for handling various basic system services and for performing hardware dependent tasks, and applications 514, including one or more downloaded user applications 714a (e.g., the Wogo application) and corresponding APIs 714b for processing data received from other devices and data to be transmitted to the other devices, security applications 714c, and/or multimedia applications 714d. In some embodiments, the non-transitory computer-readable storage medium of the memory 710 includes instructions for performing all or a portion of the operations in the exemplary processes 300 and 500 in FIGS. 3 and 5. The processor 720 is configured to access and execute the instructions, programs, applications, and modules stored in the memory 710.

Figure 8:
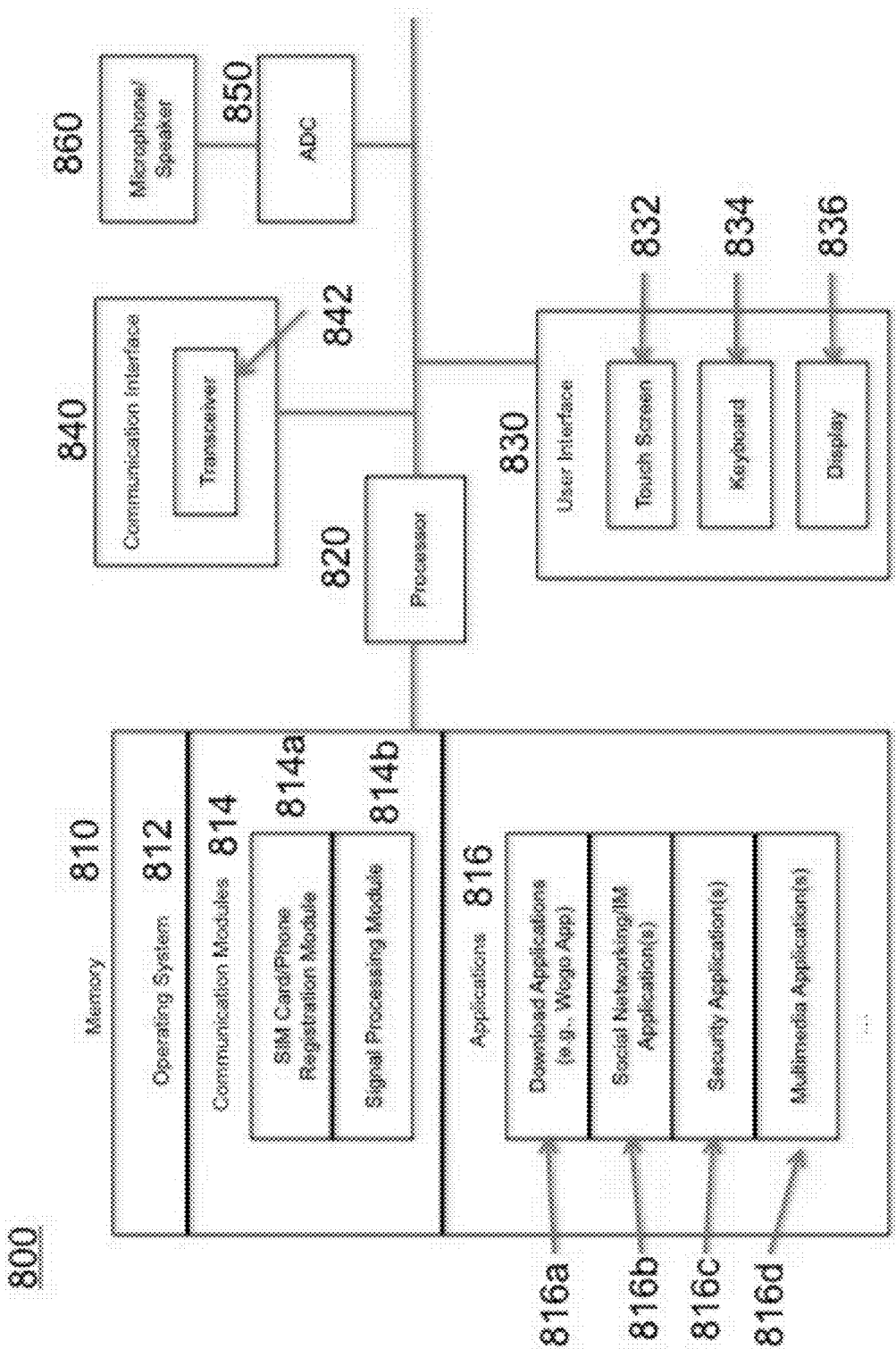
FIG. 8 is a simplified functional block diagram of an exemplary mobile device that can be implemented in the exemplary system of FIG. 1.

FIG. 8 is a simplified functional block diagram of an exemplary mobile device programmed or configured to execute a portion of the exemplary processes of FIGS. 3 and 5. This exemplary mobile device 800 can also be implemented in the exemplary system of FIG. 1 for users to connect to the network and different application servers in the network. It should be noted that the device 800 is for illustration only, and many device components included therein may not be shown or described in the following paragraphs.

As shown in FIG. 8, the exemplary device 800 comprises a memory 810, a processor 820 capable of accessing the memory 810, a user interface 830, a communication interface 840, an Audio to Digital Converter (ADC) 850 and a microphone or speaker 860 connected to the ADC. In one configuration, all device components are connected through one or more communication buses (not shown) that may include circuitry that interconnects and controls communications between different components.

The memory 810 includes high-speed random access memory, such as DRAM, SRAM, DDR RAM and/or other random access solid state memory devices; and includes non-volatile memory, such as flash memory devices, a magnetic disk storage device, and/or other non-volatile solid state storage devices. The memory 810, or alternately non-volatile memory device(s) within the memory 810, includes a non-transitory computer-readable storage medium. While the memory 810 is shown as being separate from the processor 820, all or a portion of the memory 810 may be embedded in the processor 820. In some embodiments, the memory 810 stores the following programs, modules and data structures, or a subset thereof: an operating system 812 that includes procedures for handling various basic system services and for performing hardware dependent tasks, communication modules 814 used for communicating with other devices or network controllers via the communications interface 840, such as a SIM card or phone registration module 814a and a signal processing module 814b, and applications 816, including one or more downloaded user applications 816a such as the Wogo App, various social network or messaging applications 816b in which the Wogo App is enabled, security applications 816c and multimedia applications 816d. All these applications may have associated API(s) (not shown) in the memory 810.

In some embodiments, the non-transitory computer-readable storage medium of the memory 810 includes instructions for performing all or a portion of the operations in the exemplary processes 300 and 500 in FIGS. 3 and 5. The processor 820 is configured to access and execute the instructions, programs, applications, and modules stored in the memory 810. Through the user interface 830, the processor 820 is coupled to one or more of the following: a touch screen 832, a keyboard 834 and a display 836. The processor 820 is also coupled to a transceiver 842 via the communication interface 840.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for converting a text entry into a logo in a mobile communication application, the method comprising:
   receiving a text entry in a mobile communication application;
   determining that said text entry is associated with a search word related to one or more company brands, each company brand associated with one or more logos;
   upon the determination that said text entry is associated with a search word related to one or more company brands, displaying a plurality of logos associated with said one or more company brands;
   receiving a user selection of a first logo from said plurality of logos; and
   upon receiving said user selection of said first logo, converting said text entry by displaying said first logo in place of said text entry in said mobile communication application.

2. The method of claim 1, further comprising:
   in response to said user selection, displaying one or more action items associated with said first logo, wherein said one or more action items comprise an action item of allowing a user to replace said text entry with said first logo.

3. The method of claim 2, wherein said one or more action items further comprise an action item of displaying location information of said first logo.

4. The method of claim 2, wherein said one or more action items further comprise an action item of displaying one or more user options associated with said displayed first logo, said user options including directing to a website associated with said displayed first logo.

5. The method of claim 1, further comprising determining said text entry is a brand word corresponding to a company brand, wherein said company brand is associated with one or more logos including at least said first logo.

6. The method of claim 1, further comprising:
   allowing a user to download and install an application converting a text entry into a logo in a mobile device; and
   allowing said user to enable said application in said mobile device.

7. The method of claim 6, wherein said application communicates with one or more mobile applications in said mobile device, said one or more mobile applications including at least said mobile communication application.

8. The method of claim 1, further comprising:
receiving said text entry in a mobile device;
identifying user data of said mobile device;
storing said user data in a database; and
generating a report based on said user data, said report including a conversion record of said text entry and said first logo.

9. The method of claim 8, further comprising providing said report for a company user that owns said first logo.

10. The method of claim 9, further comprising granting said company user access to said database.

11. The method of claim 10, further comprising allowing said company user to enter information related to its brands and logos including said first logo.

12. The method of claim 1, wherein said mobile communication application comprising at least one of the following: an SMS/Text application, an Instant Message (IM) application, a live chat mobile application, and a social networking application.

13. A non-transitory computer readable medium comprising executable instructions, the executable instructions, while executed, causing a processor to perform:
receiving a text entry in a mobile communication application;
determining that said text entry is associated with a search word related to one or more company brands, each company brand associated with one or more logos;
upon the determination that said text entry is associated with a search word related to one or more company brands, displaying a plurality of logos associated with said one or more company brands;
receiving a user selection of a first logo from said plurality of logos; and
upon receiving said user selection of said first logo, converting said text entry by displaying said first logo in place of said text entry in said mobile communication application.

14. The non-transitory computer readable medium of claim 13, wherein the executable instructions, while executed, causes the processor to further perform:
in response to said user selection, displaying one or more action items associated with said first logo, wherein said one or more action items comprise and action items of displaying location information of said first logo.

15. The non-transitory computer readable medium of claim 13, wherein the executable instructions, while executed, causing a processor to further perform determining said text entry is a brand word corresponding to a company brand, wherein said company brand is associated with one more logos including at least said first logo.

16. The non-transitory computer readable medium of claim 14, wherein said one or more action items further comprise an action item of displaying one or more user options associated with said displayed first logo, said user options including directing to a website associated with said displayed first logo.

17. A non-transitory computer readable medium comprising executable instructions, the executable instructions, while executed, causing a processor to perform:
receiving logo information from a user, said logo information including at least a logo associated with one or more words;
storing said logo information in a database;
communicating with an application configured to determine a text entry received in a mobile communication application is associated with one or more logos stored in said database, and if so, displaying said associated logos for a user selection, and upon the user selection of a first logo from said displayed logos, replacing converting said text entry with said first logo for display; and
generating a report for said user based on information received and processed by said application in determining whether said text entry is associated with one or more logos stored in said database, said information including use data associated with said mobile communication application.

18. A device comprising:
a screen display;
a memory comprising executable instructions; and
a processor configured to execute the executable instructions in the memory, the processor further configured to:
receiving a text entry in a mobile communication application;
determining that said text entry is associated with a search word related to one or more company brands, each company brand associated with one or more logos;
upon the determination that said text entry is associated with a search word related to one or more company brands, displaying a plurality of logos associated with said one or more company brands;
receiving a user selection of a first logo from said text plurality of logos; and
upon receiving said user selection of said first logo, converting said text entry by displaying said first logo in place of said text entry in said mobile communication application.

* * * * *